US009340208B1

(12) United States Patent
Kuros et al.

(10) Patent No.: US 9,340,208 B1
(45) Date of Patent: May 17, 2016

(54) SYSTEM AND METHOD FOR CONTROLLING THE ACCELERATION OF A WORK VEHICLE

(71) Applicant: CNH Industrial America, LLC, New Holland, PA (US)

(72) Inventors: Pawel Kuros, Wood Dale, IL (US); Ashraf Omran, Clarendon Hills, IL (US); Brian A. Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/673,944

(22) Filed: Mar. 31, 2015

(51) Int. Cl.
| | |
|---|---|
| *B60W 10/10* | (2012.01) |
| *F16H 59/46* | (2006.01) |
| *B60W 30/14* | (2006.01) |
| *F16H 63/50* | (2006.01) |
| *B60W 10/06* | (2006.01) |
| *B60W 40/105* | (2012.01) |
| *F16H 59/74* | (2006.01) |

(Continued)

(52) U.S. Cl.
CPC .............. *B60W 30/143* (2013.01); *B60W 10/06* (2013.01); *B60W 10/10* (2013.01); *B60W 30/1882* (2013.01); *B60W 40/105* (2013.01); *F16H 59/46* (2013.01); *F16H 59/74* (2013.01); *F16H 63/50* (2013.01); *B60W 2520/10* (2013.01); *B60W 2710/0644* (2013.01); *B60W 2710/1005* (2013.01); *B60W 2720/106* (2013.01); *F16H 2061/009* (2013.01); *F16H 2061/0078* (2013.01); *F16H 2063/508* (2013.01)

(58) Field of Classification Search
CPC ............................... B60W 10/10; F16H 59/46
USPC ........................................................... 701/50
See application file for complete search history.

(56) References Cited

U.S. PATENT DOCUMENTS

| 4,252,096 A | 2/1981 | Kennedy |
|---|---|---|
| 4,498,016 A | 2/1985 | Earleson et al. |

(Continued)

FOREIGN PATENT DOCUMENTS

DE    4120000 A1    12/1992

OTHER PUBLICATIONS

Agricultural Engineering International: The CIGR Ejournal. "A Basic Approach to Implement Guided Tractor Control." by R. Freimann, (12 Pages), Jul. 2007.

(Continued)

*Primary Examiner* — Tan Q Nguyen
(74) *Attorney, Agent, or Firm* — Sue C. Watson (57) ABSTRACT

A method for controlling acceleration of a work vehicle may generally include determining a vehicle speed error based on a desired speed and an actual speed of the work vehicle, calculating an initial acceleration command based on the vehicle speed error, monitoring a current engine load on the vehicle engine, determining an engine load error for the engine based on the current engine load and calculating an acceleration limit for the work vehicle based on the engine load error, wherein the acceleration limit is calculated via a PID control algorithm implemented by a computing device of the vehicle. The method may also include controlling the operation of the engine and/or the transmission of the work vehicle based on a final acceleration command to adjust the actual speed of the work vehicle, wherein the final acceleration command corresponds to the lesser of the initial acceleration command and the acceleration limit.

20 Claims, 4 Drawing Sheets (51) Int. Cl.
*B60W 30/188* (2012.01)
*F16H 61/00* (2006.01)

(56) References Cited

U.S. PATENT DOCUMENTS

| | | | |
|---|---|---|---|
| 4,849,892 | A | 7/1989 | McCombie |
| 6,385,970 | B1 | 5/2002 | Kuras et al. |
| 6,732,039 | B2 | 5/2004 | Ino et al. |
| 6,856,885 | B2 | 2/2005 | Lin et al. |
| 7,236,871 | B2 | 6/2007 | Sah et al. |
| 8,108,108 | B2 | 1/2012 | Field et al. |
| 8,140,206 | B2 | 3/2012 | Bailey et al. |
| 8,275,528 | B2 | 9/2012 | Kresse |
| 8,676,461 | B2 | 3/2014 | Nakai et al. |
| 8,935,068 | B2 | 1/2015 | Kresse et al. |
| 2007/0193262 | A1* | 8/2007 | Iwamoto .............. B60W 10/06 60/421 |
| 2011/0307155 | A1 | 12/2011 | Simard |
| 2014/0144129 | A1* | 5/2014 | Shirao .................... F15B 15/20 60/327 |
| 2014/0243125 | A1* | 8/2014 | Koga ................... F16H 63/062 474/11 |

OTHER PUBLICATIONS

Wikipedia.org PID Controller "A Proportional-Integral-Derivative Controller." (17 Pages), Mar. 2015.

* cited by examiner

FIG. -3-

SYSTEM AND METHOD FOR CONTROLLING THE ACCELERATION OF A WORK VEHICLE

FIELD OF THE INVENTION

The present subject matter relates generally to work vehicles and, more particularly, to a system and method for load-based acceleration control of a work vehicle.

BACKGROUND OF THE INVENTION

Current work vehicles, such as tractors and other agricultural vehicles, include an engine and a transmission, such as a power shift transmission (PST) or a continuously variable transmission (CVT), rotatably coupled to the engine. In addition, work vehicles typically include an electronic controller that is configured to control the operation of the engine and the transmission to achieve desired operation. For example, an operator may provide an input to the controller selecting a desired ground speed for the work vehicle. Based on the operator input, the controller may be configured to automatically control the operation of the engine and/or the transmission such that the actual speed of the work vehicle matches the desired speed selected by the operator.

Typically, when an operator commands that the ground speed of a work vehicle be increased, a control algorithm is implemented to accelerate the vehicle. Unfortunately, conventional control algorithms tend to cause undesired operational effects when the controller detects that the engine is operating at or near its power limit. Specifically, such control algorithms often result in oscillations in the acceleration of the work vehicle due to errors in the acceleration target at or near the engine's power limit. This is particularly true when the power take-off (PTO) is engaged and the power being supplied to the PTO is unknown. To address the oscillation issue, manufacturers have attempted to reduce the responsiveness of the control algorithm in order to achieve more stable acceleration. Unfortunately, this leads to extremely slow vehicle acceleration, which is undesirable for consumers.

Accordingly, an improved system and method for controlling the acceleration of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling acceleration of a work vehicle. The method may generally include determining a vehicle speed error based on a desired speed for the work vehicle and an actual speed of the work vehicle, calculating an initial acceleration command for the work vehicle based on the vehicle speed error, monitoring a current engine load on an engine of the work vehicle, determining an engine load error for the engine based on the current engine load and calculating an acceleration limit for the work vehicle based on the engine load error, wherein the acceleration limit is calculated via a PID control algorithm implemented by a computing device of the work vehicle. In addition, the method may include controlling the operation of at least one of the engine or a transmission of the work vehicle based on a final acceleration command to adjust the actual speed of the work vehicle, wherein the final acceleration command corresponds to the lesser of the initial acceleration command and the acceleration limit.

In another aspect, the present subject matter is directed to a method for controlling acceleration of a work vehicle. The method may generally include determining a vehicle speed error based on a difference between a desired speed for the work vehicle and an actual speed of the work vehicle, calculating an initial acceleration command for the work vehicle based on the vehicle speed error, monitoring a current engine load on an engine of the work vehicle, determining an engine load error for the engine based on a difference between the current engine load and a maximum engine load for the engine and calculating an acceleration limit for the work vehicle based on the engine load error, wherein the acceleration limit is calculated via a PID control algorithm implemented by a computing device of the work vehicle. In addition, the method may include controlling the operation of at least one of the engine or a transmission of the work vehicle based on a final acceleration command to adjust the actual speed of the work vehicle, wherein the final acceleration command corresponds to the lesser of the initial acceleration command and the acceleration limit. Further, the method may include resetting an integral term associated with the PID control algorithm when the vehicle speed error falls within a predetermined tolerance range.

In a further aspect, the present subject matter is directed to a system for controlling acceleration of a work vehicle. The system may generally include an engine and a transmission rotatably coupled to the engine. The system may also include a controller communicatively coupled to the engine and the transmission. The controller may include at least one processor and associated memory. The memory may store instructions that, when implemented by the processor(s), configure the controller to determine a vehicle speed error based on a desired speed for the work vehicle and an actual speed of the work vehicle, calculate an initial acceleration command for the work vehicle based on the vehicle speed error, monitor a current engine load on the engine, determine an engine load error for the engine based on the current engine load, implement a PID control algorithm to calculate an acceleration limit for the work vehicle based on the engine load error and control the operation of at least one of the engine or the transmission based on a final acceleration command to adjust the actual speed of the work vehicle, wherein the final acceleration command corresponds to the lesser of the initial acceleration command and the acceleration limit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved system and method for controlling the acceleration of a work vehicle. Specifically, in several embodiments, the disclosed system and method may be configured to utilize a proportional-integral-derivative (PID) control algorithm to limit the acceleration of the work vehicle based on the vehicle's current excess load capability. Unlike conventional control algorithms, the PID control algorithm may allow the controller to accurately compensate for errors in the acceleration target, thereby allowing engine power utilization to be maximized while still achieving stable vehicle motion (i.e., no oscillations). For example, the integral (I) term of the PID control algorithm may accumulate small errors in the difference between the current engine load and the maximum engine load, which can then be used to modify the vehicle's acceleration limit. Such a modification of the acceleration limit may allow the vehicle to utilize all of its engine power without resulting in oscillations. Moreover, as will be described below, the integral (I) term of the PID control algorithm may be reset periodically (e.g., when the actual speed of the vehicle is equal to or substantially equal to the desired vehicle speed), thereby preventing the integral (I) term from serving as a second proportional (P) term of the PID control algorithm.

Figure 1:
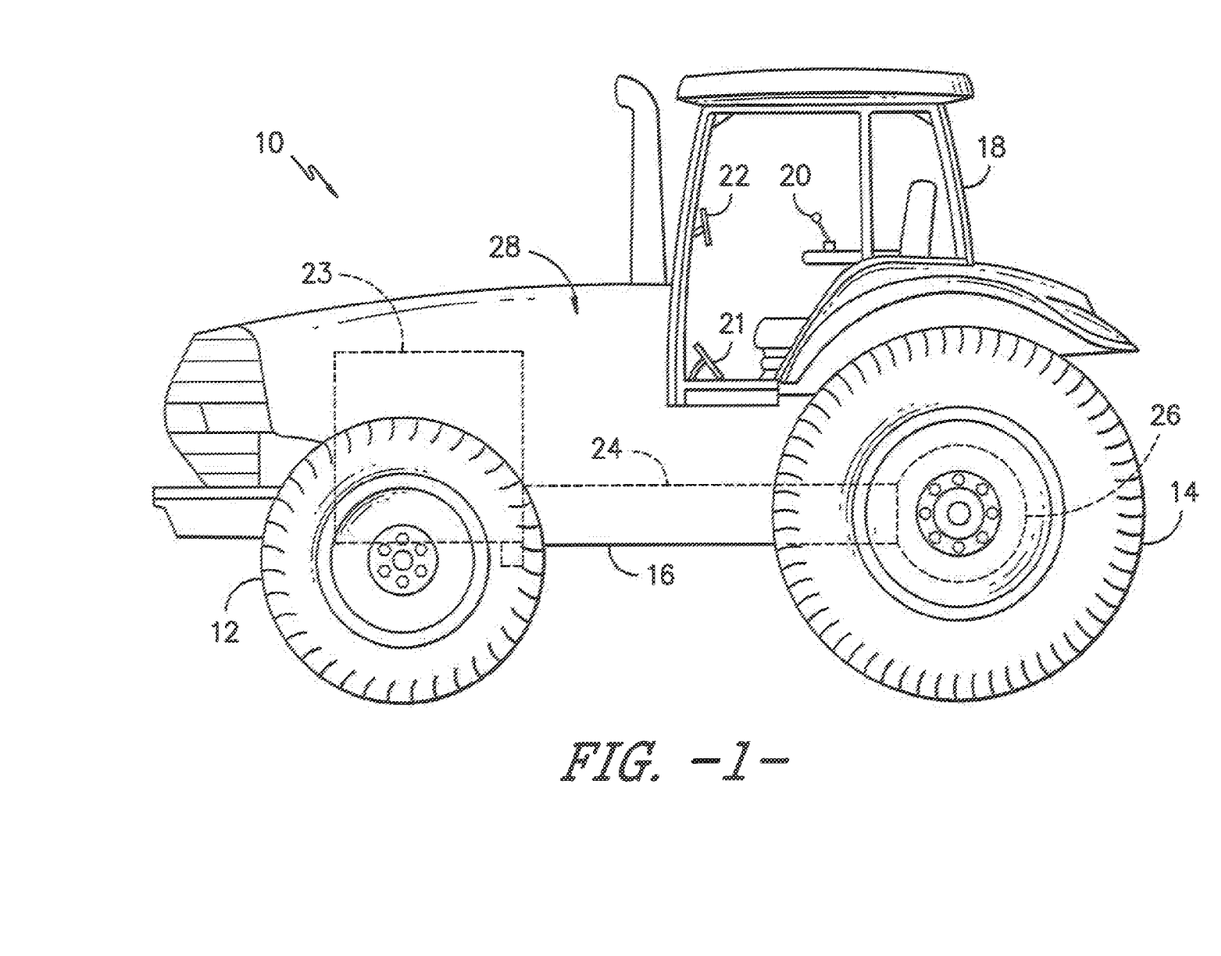
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include an input lever 20 for controlling the speed of the vehicle 10 and a clutch pedal 21. In addition, the work vehicle 10 may include a display panel 22 for displaying message windows and/or alerts to the operator and/or for allowing the operator to interface with the vehicle's controller. For instance, in one embodiment, the display panel 22 may include a touch screen and/or associated buttons or other input devices that allow the operator to provide user inputs to the controller.

Moreover, the work vehicle 10 may include an engine 23 and a transmission 24 mounted on the chassis 16. The transmission 24 may be operably coupled to the engine 23 and may provide variably adjusted gear ratios for transferring engine power to the wheels 14 via a drive axle assembly 26. The engine 23, transmission 24, and drive axle assembly 26 may collectively define a drivetrain 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
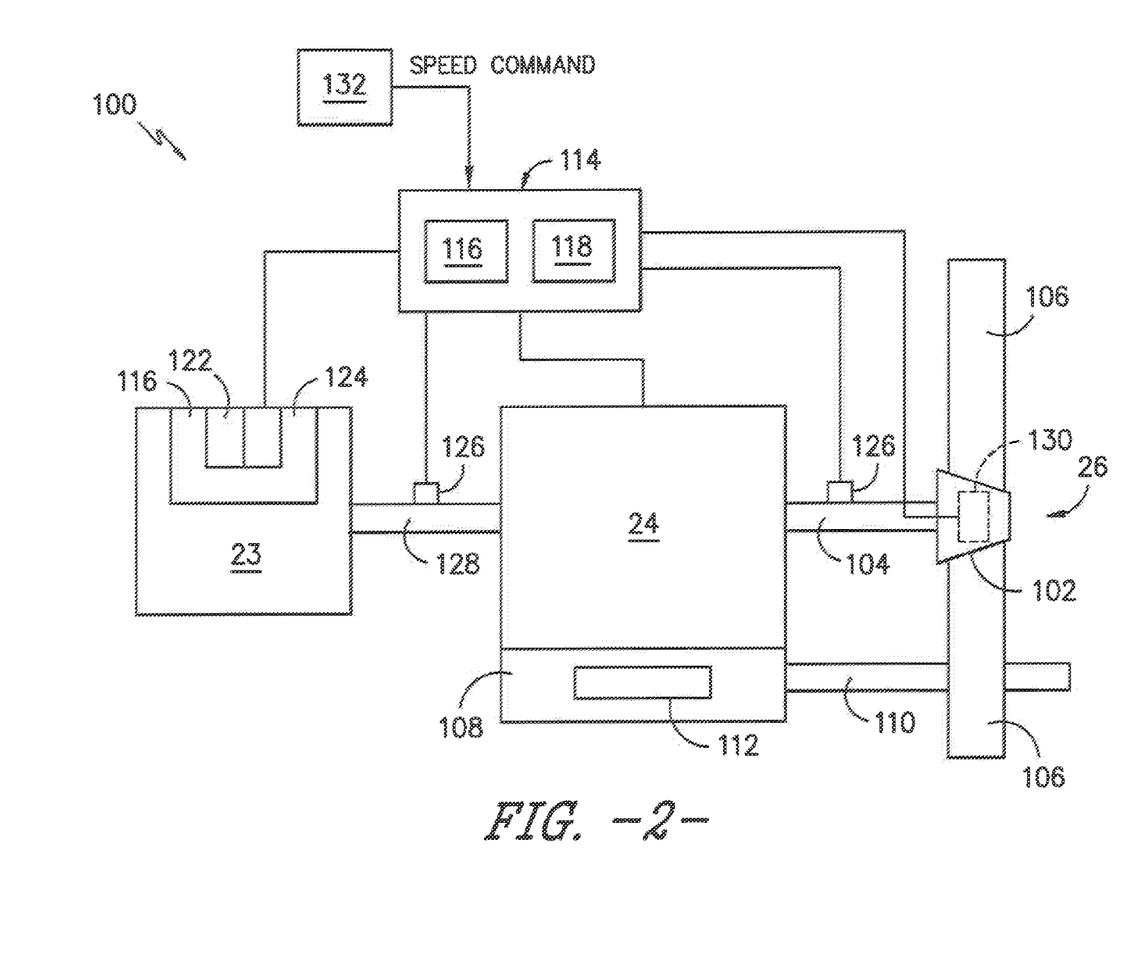
FIG. 2 illustrates a schematic view of one embodiment of a system for controlling the acceleration of a work vehicle in accordance with aspects of the present subject matter.

Referring now to FIG. 2, a schematic diagram of one embodiment of a system 100 for controlling the acceleration of a work vehicle 10 is illustrated in accordance with aspects of the present subject matter. As shown, the system 100 may include various drivetrain components of the work vehicle 10 described above, such as the engine 23, the transmission 24 and the drive axle assembly 26. As is generally understood, the drive axle assembly 26 may include a differential 102 coupled to an output shaft 104 of the transmission 24 and one or more axle shafts 106 coupled to the differential 102 for transferring power to the drive wheels of the vehicle 10 (e.g., the rear wheels 14).

Additionally, the system 100 may also include one or more other power consuming components of the work vehicle 10. For example, as shown in FIG. 2, the system 100 may also include a power take-off (PTO) 108 configured to transfer power from the engine 23 to one or more implements (not shown) of the work vehicle 10 via a PTO shaft 110. For instance, as shown in FIG. 2, in one embodiment, the PTO 110 may form part of the transmission 24 and may be configured to be engaged via a PTO clutch 112.

As shown in FIG. 2, the system 100 may also include a controller 114 configured to control the operation of one or more components of the work vehicle 10, such as the engine 23 and the transmission 24. For example, the controller 114 may be communicatively coupled to an engine governor 116 in order to control and/or monitor the speed and/or torque of the engine 23. Similarly, the controller 114 may be coupled to various components of the transmission 24 (e.g., one or more clutch valves, swash plate actuators and/or the like) in order to control the operation of the transmission 24.

It should be appreciated the controller 114 may generally comprise any suitable processor-based device known in the art. Thus, in several embodiments, the controller 114 may include one or more processor(s) 116 and associated memory 118 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 118 of the controller 114 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 118 may generally be configured to store suitable computer-readable instructions that, when implemented by the processor(s) 116, configure the controller 114 to perform various computer-implemented functions, such as the control algorithm 200 described below with reference to FIG. 3 and/or the method 300 described below with reference to FIG. 4. In addition, the controller 114 may also include various other suitable components, such as a communications circuit or module, one or more input/output channels, a data/control bus and/or the like.

It should also be appreciated that the controller 114 may correspond to an existing controller of the work vehicle 10 (e.g., an existing engine and/or transmission controller) or the controller 114 may correspond to a separate controller. For instance, in one embodiment, the controller 114 may form all or part of a separate plug-in module that may be installed within the work vehicle 10 to allow for the disclosed system and method to be implemented without requiring additional software to be uploaded onto existing control devices of the vehicle 10.

The system 100 may also include one or more sensors for monitoring various operating parameters of the work vehicle 10. For example, as shown in FIG. 2, the controller 114 may be communicatively coupled to various sensors, such as a torque sensor 122 and/or a speed sensor 124, mounted on and/or within the engine 23 for monitoring the engine torque loads and/or the engine speed. In one embodiment, the sensor(s) 122, 124 may comprise an internal sensor of the engine governor 116. In another embodiment, the sensor(s) 122, 124 may comprise a separate sensor(s) configured to monitor the torque loads and/or the speed of the engine 23. Regardless, by monitoring the engine torque and the engine speed via the sensor(s) 122, 124, the controller 114 may be allowed to continuously calculate the current engine power and engine load of the engine 23.

Moreover, the system 100 may also include one or more sensors 126 (e.g., shaft encoders, shaft sensors and/or any other suitable speed sensors) configured to monitor the rotational speeds of the various shafts of the transmission 24. For example, as shown in FIG. 2, the transmission 24 may include a speed sensor 126 mounted to and/or within the transmission input shaft 128 and/or the transmission output shaft 104 to measure the input and/or output speeds of the transmission 24. The speed sensors 126 may, in turn, be communicatively coupled to the controller 114 to permit the speed measurements to be transmitted to the controller 114 for subsequent processing and/or analysis.

In addition, the system 100 may include various other sensors configured to monitor any other suitable operating parameters of the work vehicle 10. For example, in one embodiment, a sensor 130 may be associated with the drive axle assembly 26 for monitoring one or more operating parameters of the assembly 26, such as a torque load transmitted through the assembly 26, a rotational speed of one or more components of the assembly 26 and/or an axle temperature associated with the assembly 26. Moreover, the work vehicle 10 may include a sensor (not shown) for monitoring the ground speed of the vehicle 10.

As shown in FIG. 2, the system 100 may also include one or more input devices 132 communicatively coupled to the controller 114 to allow for operator inputs to be provided to the system 100. For example, as indicated above, the work vehicle 10 may include an input device 132 configured to permit an operator to input a speed command corresponding to a desired ground speed of the vehicle 10. Upon receipt of the speed command, the controller 114 may be configured to control the various components of the work vehicle 10 in order to achieve the commanded ground speed. For example, the controller 114 may be configured to regulate the engine speed and/or the transmission ratio to accelerate and/or decelerate the work vehicle 10, thereby adjusting the speed of the vehicle 10 to the commanded ground speed. As will be described below, such acceleration control of the work vehicle 10 may be implemented using a PID control algorithm that allows for improved vehicle stability and enhanced engine utilization regardless of whether any power consuming components of the vehicle (e.g., the PTO) are turned on or off.

Figure 3:
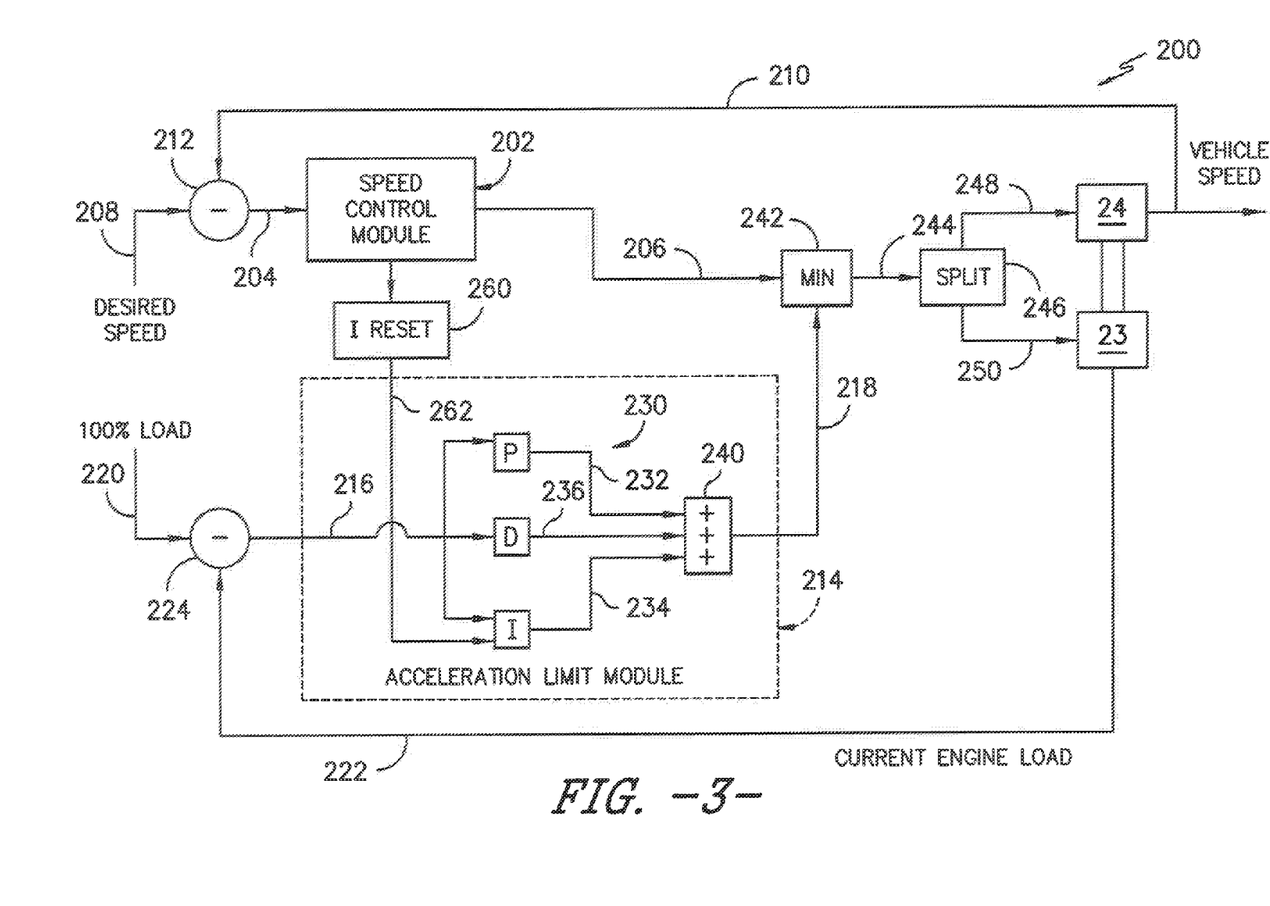
FIG. 3 illustrates a flow diagram of one embodiment of a control algorithm that may be implemented by a vehicle controller to control the acceleration of a work vehicle in accordance with aspects of the present subject matter.

Referring now to FIG. 3, a flow diagram of one embodiment of a control algorithm 200 that may be utilized to control the acceleration of a work vehicle 10 is illustrated in accordance with aspects of the present subject matter. In general, the control algorithm 200 will be described herein as being implemented by the controller 114 of the system 100 described above with reference to FIG. 2. However, it should be appreciated that the various processes and/or modules described below with reference to FIG. 3 may alternatively be implemented by a separate computing device or by a combination of computing devices. For instance, the speed control module 202 and the acceleration limit module 214 described below may each be implemented by a single computing device or by separate computing devices.

As shown in FIG. 3, one or more processes of the control algorithm 200 may be implemented by a speed control module 202. In general, the speed control module 202 may be configured to receive a speed error signal 204 as an input and, based on such input, generate an acceleration command 206 for the work vehicle 10. In several embodiments, the speed error signal 204 may correspond to a difference between a desired speed for the work vehicle 10 and a current or actual speed of the work vehicle 10. For example, as shown in FIG. 3, a first speed signal 208 corresponding to the desired speed for the work vehicle 10 and a second speed signal 210 corresponding to the actual speed of the work vehicle 10 may be input into a difference block 212, with the resulting output corresponding to the speed error signal 204. The speed control module 202 may then be configured to receive the speed error signal 204 and calculate an appropriate acceleration command 206 based on the speed error signal 204 for adjusting the actual speed of the work vehicle 10 to the desired vehicle speed.

It should be appreciated that the first and second speed signals 208, 210 may correspond to input signals received by the controller 114 and/or input signals generated by the controller 114. For example, as described above with reference to FIG. 2, a suitable input device 132 may be communicatively coupled to the controller 114 to allow the operator to provide a speed command signal corresponding to the desired ground speed of the work vehicle 10. Such speed command signal may, for instance, correspond to the first speed signal 208. Similarly, as indicated above, the controller 114 may be communicatively coupled to one or more sensors that allow the controller 114 to directly or indirectly monitor the actual speed of the work vehicle 10. For instance, based on the monitored output speed of the transmission 24 (e.g., via speed sensor 126), the controller 114 may be configured to calculate the current speed of the work vehicle 10, which may then be input into the difference block 212 as the second speed signal 210.

Additionally, as shown in FIG. 3, one or more processes of the control algorithm 200 may also be implemented by an acceleration limit module 214. In general, the acceleration limit module 214 may be configured to receive an engine load error signal 216 as an input and, based on such input, generate an acceleration limit command 218 for the work vehicle 10. In several embodiments, the engine load error signal 216 may correspond to a difference between a current engine load for the engine 24 and a maximum engine load for the engine 23. For example, as shown in FIG. 3, a first load signal 220 corresponding to the maximum engine load for the engine 23 and a second load signal 222 corresponding to the current engine load of the engine 23 may be input into a difference block 224, with the resulting output corresponding to the engine load error signal 216. As such, the engine load error signal 216 may generally correspond to the excess load capability for the engine 23 based on the current operating conditions. For example, if the engine 23 is currently operating at 90% load and the maximum engine load corresponds to 100% load, the engine 23 has an excess load capability of 10%. Based on such excess load capability, the acceleration limit module 214 may be configured to generate the acceleration limit command 218 for the work vehicle 10. For example, if the engine's excess load capability is substantially high, the acceleration limit command 218 may correspond to a higher acceleration value given the additional operational capability of the engine 23. However, if the engine's excess load capability is substantially low, the acceleration limit command 218 may correspond to a significantly lower acceleration value given the currently reduced operational capability of the engine 23.

It should be appreciated that the first and second load signals 220, 222 may correspond to input signals received by the controller 114 and/or input signals generated by the controller 114. For example, as indicated above, the controller 114 may be communicatively coupled to one or more sensors that allow the controller 114 to directly or indirectly monitor the current engine load of the engine 23. For instance, based on the monitored engine speed and torque (e.g., via sensors 122, 124), the controller 114 may be configured to calculate the current engine load.

As shown in FIG. 3, in several embodiments, the acceleration limit module 214 may be configured to utilize a proportional-integral-derivative (PID) control algorithm 230 to calculate the acceleration limit 218 based on the received engine load error signal 216. As is generally understood, the PID control algorithm 230 may correspond to a closed-loop control algorithm that is used to calculate an "error" as the difference between a measured process value (e.g., the current engine load) and a desired setpoint value (e.g., the maximum engine load). Thus, utilizing the PID control algorithm 230, the controller 114 may be configured to calculate a suitable acceleration limit 218 for the work vehicle 10 that attempts to minimize the error between the current engine load and the maximum engine load, thereby allowing the maximum engine power to be utilized, if necessary, to increase the speed of the work vehicle 10.

As shown, the PID control algorithm 230 implemented by the acceleration limit module 214 may generally include three separate parameters or terms, a proportional (P) term 232, an integral (I) term 234, and a derivative (D) term 236. In general, such terms or values may be configured to be combined to provide the desired output (i.e., the acceleration limit command 218) from the PID control loop as a function of time. Specifically, as shown in FIG. 3, the proportional (P) term 232, the integral (I) term 234 and the derivative (D) term 236 may be input into a summation block 240, within which the various terms may be summed to generate the acceleration limit command 218.

It should be appreciated that the proportional (P) term 232 associated with the PID control algorithm 230 may generally be configured to implement a change to the calculated acceleration limit 218 that is proportional to the error between the current engine load and the maximum engine load (i.e., the load error signal 216) multiplied by a suitable proportional gain factor. For example, the proportional (P) term 232 may generally be calculated according to the following equation (Equation 1):

$$P = K_p e(t) \tag{1}$$

wherein, P corresponds to the proportional term 232 output to the summation block 240, $K_p$ corresponds to the proportional gain factor and e(t) corresponds to the load error signal 216.

Similarly, it should be appreciated that the integral (I) term 234 associated with the PID control algorithm 200 may generally be configured to implement a change to the calculated acceleration limit 218 that is proportional to the magnitude and duration of the error between the current engine load and the maximum engine load (i.e., the load error signal 216) by integrating the error over time and multiplying the value by a suitable integral gain factor. For example, the integral (I) term 234 may generally be calculated according to the following equation (Equation 2):

$$I = K_i \int_0^t e(t) d_t \tag{2}$$

wherein, I corresponds to the integral term 234 output to the summation block 240, $K_i$ corresponds to the integral gain factor, e(t) corresponds to the load error signal 216 and t corresponds to the time over which the error is integrated.

Additionally, it should be appreciated that the derivative (D) term 236 associated with the PID control algorithm 200 may generally be configured to implement a change to the calculated acceleration limit 218 as a function of the slope of the error between the current engine load and the maximum engine load (i.e., the load error signal 216) over time multiplied by a suitable derivative gain factor. For example, the derivative (D) term 236 may generally be calculated according to the following equation (Equation 3):

$$D = K_d \frac{d}{d_t} e(t) \tag{3}$$

wherein, D corresponds to the derivative term 236 output to the summation block 240, $K_d$ corresponds to the derivative gain factor and e(t) corresponds to the load error signal.

As indicated above, the proportional (P), integral (I) and derivative (D) terms 232, 234, 236 may be summed (e.g., at summation block 240) to calculate the corresponding acceleration limit command 218. Thus, combining Equations (1)-(3), the acceleration limit 218 may generally be calculated according to the following equation (Equation 4):

$$A_{lim} = K_p e(t) + K_i \int_0^t e(t) d_t + K_d \frac{d}{d_t} e(t) \tag{4}$$

wherein, $A_{lim}$ corresponds to the calculated acceleration limit 218, e(t) corresponds to the load error signal 216, $K_p$ corresponds to the proportional gain factor, $K_i$ corresponds to the integral gain factor and $K_d$ corresponds to the derivative gain factor.

Referring still to FIG. 3, upon calculating the initial acceleration command 206 and the acceleration limit command 218, the acceleration values corresponding to such commands may be input into a minimum block 242, with the lesser of the two acceleration values being output therefrom as a final acceleration command 244. Thus, for example, if the acceleration command 206 output by the speed control module 202 exceeds the acceleration limit command 218 output by the acceleration limit module 214, the acceleration value corresponding to the acceleration limit command 218 may output as the final acceleration command 244, thereby ensuring that the acceleration commanded by the controller 114 does not exceed the current load-based capabilities of the engine 23. However, if the acceleration command 206 output by the speed control module 202 does not exceed the acceleration limit command 218 output by the acceleration limit module 214, the acceleration value corresponding to the acceleration command 206 may output as the final acceleration command 244.

As shown in FIG. 3, in several embodiments, the final acceleration command 244 may be split (e.g., at command split box 246) into separate transmission and engine commands 248, 250 for adjusting an operational parameter of the transmission 24 and/or the engine 23 in a manner that allows the actual vehicle speed to be adjusted in accordance with the final acceleration command 244. For example, to provide the commanded acceleration, the engine command 250 may correspond to a suitable control command for adjusting the engine speed of the engine 23 whereas transmission command 248 may correspond to a suitable control command for adjusting the transmission ratio of the transmission 24.

It should be appreciated that, as an alternative to splitting the final acceleration command 244 between the engine 23 and the transmission 24, the commanded acceleration may be achieved by adjusting an operational operation of only one of such components. For example, in one embodiment, the commanded acceleration associated with the final acceleration command 244 may be achieved by only adjusting the engine speed of the engine 23 or by only adjusting the transmission ratio of the transmission 24.

Additionally, as shown in FIG. 3, in several embodiments, the control algorithm 200 may be configured to implement an integral reset function (e.g., at box 260) that is configured to reset the integral (I) term 234 when the speed error signal 204 input into the speed control module 202 falls within a predetermined tolerance range defined at or around zero. Specifically, when the speed error signal 204 falls within the predetermined tolerance range, a reset signal 262 may be transmitted that resets the integral (I) term 234. Such resetting of the integral (I) term 234 when the actual speed of the work vehicle 10 is equal or substantially equal to the desired speed may be utilized to prevent the integral (I) term 234 from performing like another proportional (P) term for subsequent accelerations of the work vehicle 10. Moreover, the resetting of the integral (I) term 234 can be implemented without impacting the vehicle's acceleration due to the fact that, at such a small speed error signal 204, the acceleration command 206 should be less than the acceleration limit command 218.

It should be appreciated that the predetermined tolerance range may generally correspond to any suitable tolerance range defined at or around zero that provides for the functionality described herein. However, in several embodiments, the predetermined tolerance range may be equal to zero plus or minus about 0.4 kilometers per hour (KPH), such as a tolerance range of zero plus or minus about 0.2 KPH or a tolerance range of zero plus or minus about 0.1 KPH.

It should be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

Figure 4:
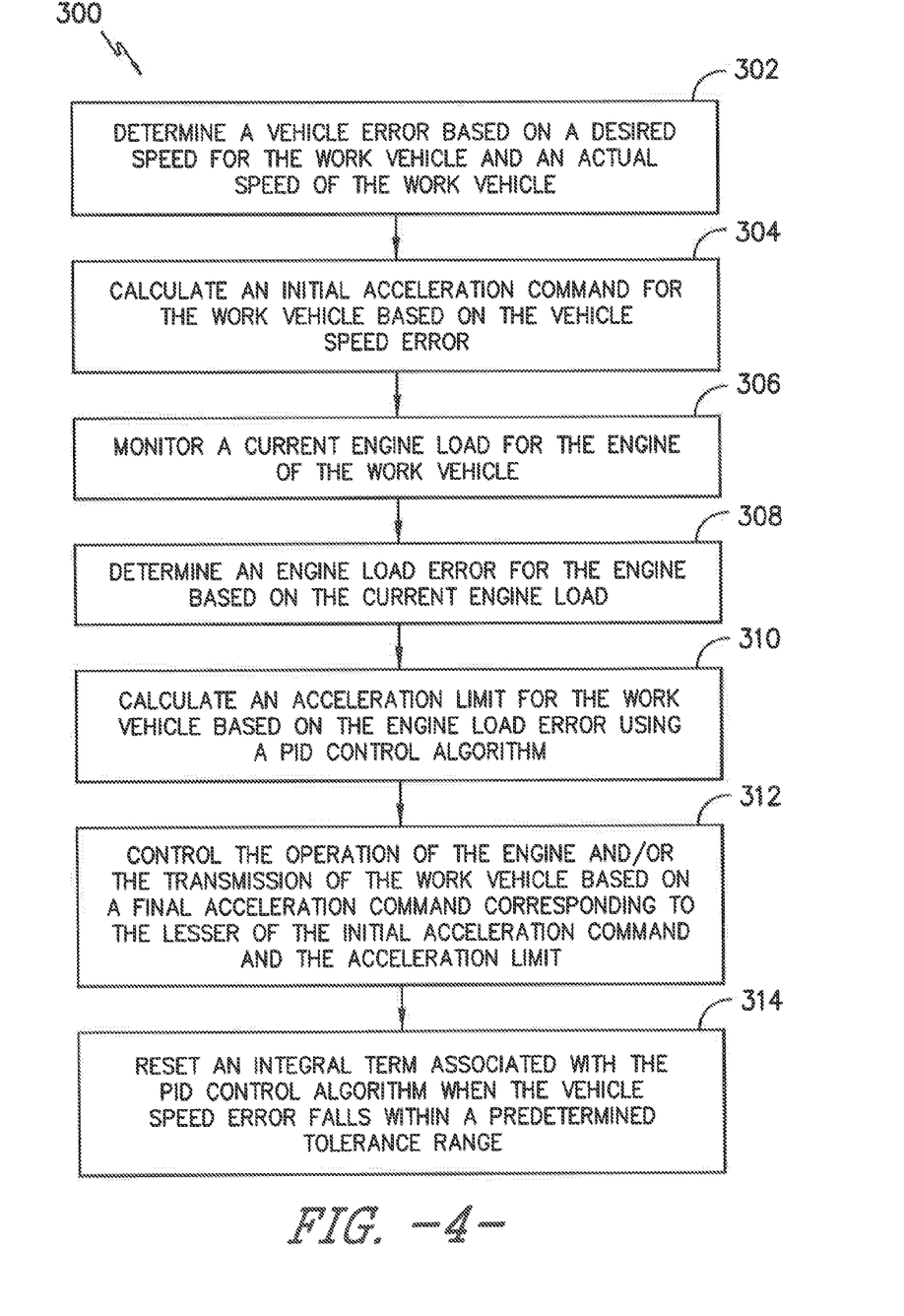
FIG. 4 illustrates a flow diagram of one embodiment of a method for controlling the acceleration of a work vehicle in accordance with aspects of the present subject matter.

Referring now to FIG. 4, a flow diagram of one embodiment of a method 300 for controlling the acceleration of a work vehicle 10 is illustrated in accordance with aspects of the present subject matter. In general, the method 300 will be described herein with reference to the system 100 described above with reference to FIG. 2 and the control algorithm 200 described above with reference to FIG. 3. However, it should be appreciated by those of ordinary skill in the art that the disclosed method 300 may be implemented within any other system and/or using any other suitable control algorithm. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302), the method 300 includes determining a vehicle speed error based on a desired speed for the work vehicle 10 and an actual speed of the work vehicle 10. For example, as indicated above, the controller 114 may be configured to receive and/or generate speed signals 208, 210 associated with the desired speed and the actual speed of the work vehicle 10. As such, the controller 114 may be configured to calculate the vehicle speed error by determining the difference between the desired speed and the actual speed (e.g., at difference block 212 shown in FIG. 3).

Additionally, at (304), the method 300 includes calculating an initial acceleration command for the work vehicle 10 based on the vehicle speed error. Specifically, as described above, the controller 114 may, in several embodiments, be configured to implement a speed control module 202 that generates an acceleration command based on the vehicle speed error. In such embodiments, the speed control module 202 may be configured to calculate an appropriate acceleration value for adjusting the actual speed of the work vehicle 10 to match the desired speed input from the operator.

Moreover, at (306), the method 300 includes monitoring a current engine load for the engine 23 of the work vehicle 10. For example, as indicated above, the controller 114 may be communicatively coupled to suitable sensors for directly and/or indirectly monitoring the current engine load for the engine 23. Specifically, in several embodiments, based on the measurements provided by the engine torque and speed sensors 122, 124, the controller 114 may be configured to calculate the current engine load the engine 23.

Referring still to FIG. 4, at (308), the method 300 includes determining an engine load error for the engine 23 based on the current engine load. For example, as indicated above, the engine load error may be determined as a function of both the current engine load and a maximum engine load for the engine. In such an embodiment, the controller 114 may be configured to calculate the engine load error by determining the difference between the maximum engine load and the current engine load (e.g., at difference block 224 shown in FIG. 3).

In addition, at (310), the method 300 includes calculating an acceleration limit for the work vehicle 10 based on the engine load error using a PID control algorithm. As indicated above, the PID control algorithm 230 may allow for an acceleration limit to be calculated that ensures maximum engine utilization based on the excess load capability of the engine 23. For example, if the engine 23 has substantial excess load capability under the current loading conditions of the work vehicle 10, the PID control algorithm may be adapted to increase the acceleration limit. However, if the engine 23 has little or no excess load capability under the current loading conditions of the work vehicle 10, the PID control algorithm may be adapted to decrease the acceleration limit.

Further, at (312), the method 300 may include controlling the operation of at least one of the engine or the transmission of the work vehicle based on a final acceleration command corresponding to the lesser of the initial acceleration command and the acceleration limit. Specifically, as indicated above, the acceleration command 206 generated by the speed control module 202 and the acceleration limit command 218 generated by the acceleration limit module 214 may be input into a minimum block 242, with the lesser of the two acceleration values being set as the final acceleration command 244. The final command 224 may then be transmitted to the transmission 24 and/or the engine 23 to adjust an operational parameter of such component(s) in a manner that results in the actual speed of the work vehicle 10 being adjusted as desired.

Moreover, at (314), the method 300 may include resetting an integral term associated with the PID control algorithm when the vehicle speed error falls within a predetermined tolerance range. Specifically, as indicated above, when the vehicle speed error is reduced to a value within a predetermined tolerance range defined at or around zero, the integral (I) term 234 associated with the PID control algorithm 230 may be reset, thereby preventing the integral (I) term 234 from acting as a second proportional term.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling acceleration of a work vehicle, the method comprising:
   determining, by a computing device, a vehicle speed error based on a desired speed for the work vehicle and an actual speed of the work vehicle;
   calculating, by the computing device, an initial acceleration command for the work vehicle based on the vehicle speed error;
   monitoring, by the computing device, a current engine load on an engine of the work vehicle;
   determining, by the computing device, an engine load error for the engine based on the current engine load;
   calculating, by the computing device, an acceleration limit for the work vehicle based on the engine load error, the acceleration limit being calculated via a PID control algorithm implemented by the computing device; and
   controlling, by the computing device, the operation of at least one of the engine or a transmission of the work vehicle based on a final acceleration command to adjust the actual speed of the work vehicle, the final acceleration command corresponding to the lesser of the initial acceleration command and the acceleration limit.

2. The method of claim 1, further comprising resetting an integral term associated with the PID control algorithm when the vehicle speed error falls within a predetermined tolerance range.

3. The method of claim 2, wherein the predetermined tolerance range corresponds to zero plus or minus about 0.4 kilometers per hour.

4. The method of claim 1, wherein controlling the operation of the least one of the engine or the transmission of the work vehicle based on the final acceleration command comprises splitting the final acceleration command between the engine and the transmission such that an operational parameter of both the engine and the transmission is varied in order to adjust the actual speed of the work vehicle.

5. The method of claim 4, wherein the operational parameter for the engine corresponds to an engine speed and the operational parameter for the transmission corresponds to a transmission ratio.

6. The method of claim 1, further comprising calculating a proportional term, an integral term and a derivative term associated with the PID control algorithm based on the engine load error.

7. The method of claim 6, wherein calculating the acceleration limit comprises summing the proportional term, the integral term and the derivative term.

8. The method of claim 1, wherein determining the engine load error comprises determining a difference between the current engine load and a maximum engine load for the engine.

9. The method of claim 1, wherein determining the vehicle speed error comprises:
   receiving an operator input associated with the desired speed for the work vehicle;
   monitoring the actual speed of the work vehicle; and
   determining a difference between the operator-selected desired speed and the monitored actual speed.

10. A method for controlling acceleration of a work vehicle, the method comprising:
    determining, by a computing device, a vehicle speed error based on a difference between a desired speed for the work vehicle and an actual speed of the work vehicle;
    calculating, by the computing device, an initial acceleration command for the work vehicle based on the vehicle speed error;
    monitoring, by the computing device, a current engine load on an engine of the work vehicle;
    determining, by the computing device, an engine load error for the engine based on a difference between the current engine load and a maximum engine load for the engine;
    calculating, by the computing device, an acceleration limit for the work vehicle based on the engine load error, the acceleration limit being calculated via a PID control algorithm implemented by the computing device;
    controlling, by the computing device, the operation of at least one of the engine or a transmission of the work vehicle based on a final acceleration command to adjust the actual speed of the work vehicle, the final acceleration command corresponding to the lesser of the initial acceleration command and the acceleration limit; and resetting, by the computing device, an integral term associated with the PID control algorithm when the vehicle speed error falls within a predetermined tolerance range.

11. The method of claim 10, wherein the predetermined tolerance range corresponds to zero plus or minus about 0.4 kilometers per hour.

12. The method of claim 10, wherein controlling the operation of the least one of the engine or the transmission of the work vehicle based on the final acceleration command comprises splitting the final acceleration command between the engine and the transmission such that an operational parameter of both the engine and the transmission is varied in order to adjust the actual speed of the work vehicle.

13. The method of claim 12, wherein the operational parameter for the engine corresponds to an engine speed and the operational parameter for the transmission corresponds to a transmission ratio.

14. A system for controlling acceleration of a work vehicle, the system comprising:
   an engine;
   a transmission rotatably coupled to the engine; and
   a controller communicatively coupled to the engine and the transmission, the controller including at least one processor and associated memory, the memory storing instructions that, when implemented by the at least one processor, configure the controller to:
      determine a vehicle speed error based on a desired speed for the work vehicle and an actual speed of the work vehicle;
      calculate an initial acceleration command for the work vehicle based on the vehicle speed error;
      monitor a current engine load on the engine;
      determine an engine load error for the engine based on the current engine load;
      implement a PID control algorithm to calculate an acceleration limit for the work vehicle based on the engine load error; and
      control the operation of at least one of the engine or the transmission based on a final acceleration command to adjust the actual speed of the work vehicle, the final acceleration command corresponding to the lesser of the initial acceleration command and the acceleration limit.

15. The system of claim 14, wherein the controller is further configured to reset an integral term associated with the PID control algorithm when the vehicle speed error falls within a predetermined tolerance range.

16. The system of claim 15, wherein the predetermined tolerance range corresponds to zero plus or minus about 0.4 kilometers per hour.

17. The system of claim 14, wherein the controller is configured to split the final acceleration command between the engine and the transmission such that an operational parameter of both the engine and the transmission is varied in order to adjust the actual speed of the work vehicle.

18. The system of claim 17, wherein the operational parameter for the engine corresponds to an engine speed and the operational parameter for the transmission corresponds to a transmission ratio.

19. The system of claim 14, wherein the controller is configured to calculate a proportional term, an integral term and a derivative term associated with the PID control algorithm based on the engine load error.

20. The system of claim 19, wherein the controller is configured to calculate the acceleration limit by summing the proportional term, the integral term and the derivative term.

* * * * *